United States Patent Office 3,352,020
DEVICE TO MOUNT PRINTS ON A BASE
Vernon L. Kipping, 540 Melrose Ave.,
San Francisco, Calif. 94127
Filed Apr. 19, 1965, Ser. No. 448,989
4 Claims. (Cl. 33—174)

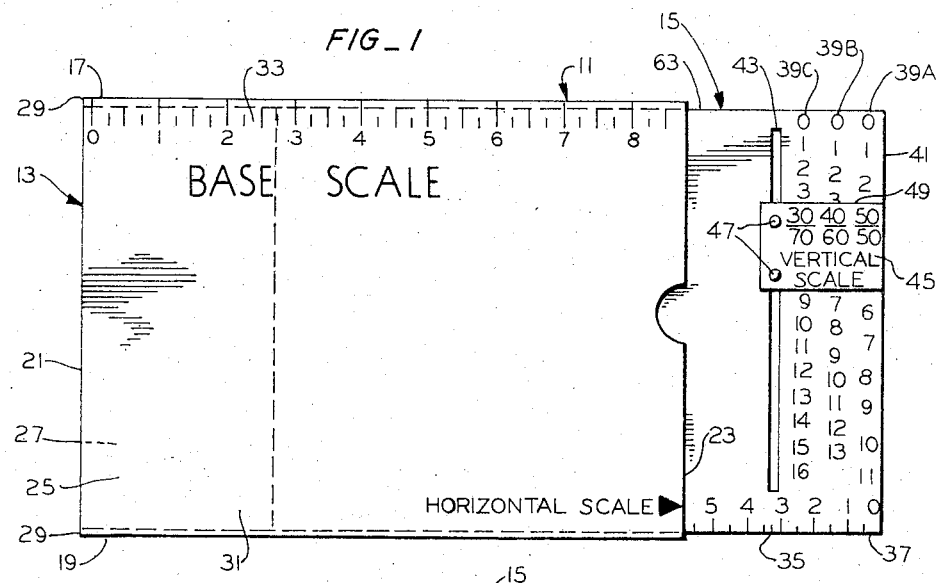
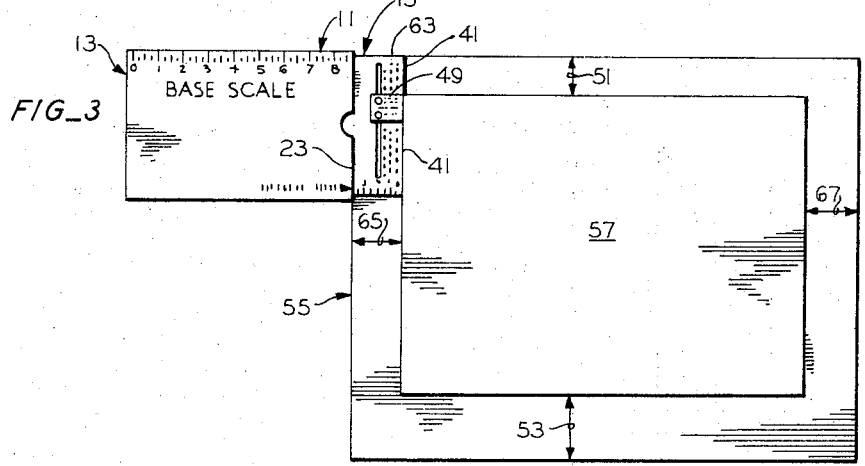
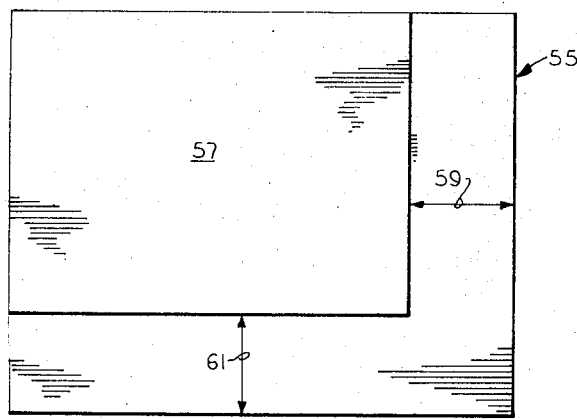
INVENTOR.
VERNON L. KIPPING

ABSTRACT OF THE DISCLOSURE

An apparatus for facilitating the mounting of pictures and prints on a base. A card is imprinted along its lower longitudinal edge with a scale calibrated in units equal to one-half the units of a corresponding scale imprinted along the edge of an envelope in which the card is longitudinally slidable. The card also has a scale imprinted along its leading transverse edge. The apparatus permits the horizontal centering and vertical placement of a print on a base in a single measuring operation.

---

The present invention relates to a new and improved device to mount pictures and prints on a base.

A principal object and advantage of the present invention is to simplify and facilitate the mounting of photographic and art prints on a mat, base or mount. This is accomplished by first measuring the horizontal and vertical dimensional differences between the print and mount, by means of a suitable scale on the device. These differences are then set on a sliding horizontal and vertical calculating scales, which scales may then be also used to physically align the print on the mount with the desired margin sizes.

Another advantage of this invention is that the horizontal and vertical calculating scales serve the dual function of calculating the desired marginal dimension as well as providing physical means by which that dimension may be measured out on the mounting base.

An additional feature of this device is that the horizontal and vertical calculating scales are oriented with respect to each other on the device such that the desired horizontal and vertical dimensions may be measured out simultaneously and with a single placement of the device on the mounting sheet.

A still further advantage of this invention is the provision of a plurality of different vertical scales which provide different dimensional proportions between the upper and the lower vertical margin width. This feature is desirable in many instances where it is desired that the top margin be less than the bottom. The device further provides means for proportioning the top and bottom margins at varying ratios.

A further feature of the mounting device is that the horizontal calculating scale when set, automatically provides a scale to center the print on its mounting base with equal left and right hand margin widths.

Other features of the invention are: it is of simple construction and is inexpensively manufactured; it is easily and simply operated and serves to greatly facilitate the process of mounting prints on a base; and is of a substantially flat and compact configuration which is easily carried and mailed.

Other objects of the present invention will become apparent upon reading the following specification and referring to the accompanying drawings in which similar characters of reference represent corresponding parts in each of the several views.

In the drawing:

FIG. 1 is a front elevation of a mounting device embodying the present invention.

FIG. 2 is a front elevation of a print and mount in a position to measure their size differences.

FIG. 3 is a front elevation of a mounting device in place to indicate the correct position of the print on the mount.

The present invention provides means to greatly simplify and expedite the process of mounting pictures, prints, photographs, etc. on a base mount. Device 11 comprises two main parts, envelope 13 and slide 15. Envelope 13 and slide 15 may be constructed of cardboard, plastic Celluloid, or the like. Envelope 13 is closed along edges 17 and 19 and along end 21. Edge 23 of envelope 13 is open and slidably receives slide 15. Upper surface 25 and lower surface 27 of envelope 13 are spaced apart by separators 29, which create cavity 31 within which slide 15 is free to move. Sufficient friction between envelope 13 and slide 15 is provided so that slide 15 is free to move but will remain in position once set. Slide 15 is of a size to move within cavity 31 in envelope 13 and to be entirely contained within envelope 13 when fully inserted.

Base scale 33 is printed on or affixed to surface 25 along upper edge 17 of envelope 13. Base scale 33 is calibrated in whole units (inches or centimeters) for a suitable distance.

Horizontal scale 35 is printed along lower edge 37 of slide 15. Horizontal scale 35 is calibrated in half-units, e.g., the distance between "1" and "2" on scale 35 is equal to one-half inch. Edge 23 serves as the index for scale 35.

Vertical scales 39 are printed along end edge 41 of slide 15. Slide 15 is of a substantial length along edge 41 to ensure a sufficiently long edge against which print 57 may be oriented. In the form shown herein, three vertical scales 39 are shown. Immediately adjacent scales 39 is vertical slot 43 formed in slide 15. Slot 43 extends substantially along the width of slide 15. Vertical scale locator 45 slides vertically up and down along the length of slot 43 by means of rivets 47 which extend through slot 43. Upper edge 49 of locator 45 serves as the index for scales 39. Vertical scale 39A is calibrated in half-units so as to provide equal dimensions for upper margin 51 and lower margin 53 on base 55. Vertical scale 39B is calibrated so as to provide a 40/60 ratio between upper margin 51 and lower margin 53. Vertical scale 39C is calibrated so as to provide a 30/70 ratio between upper margin 51 and lower margin 53.

In use, the operator has print 57 and base 55 upon which print 57 is to be mounted for framing or exhibition. The first step is to determine the dimensional differences between print 57 and base 55. The operator places print 57 and base 55 with two edges coinciding congruently as shown in FIG. 2. By means of base scale 33, the operator measures horizontal difference 59 and vertical difference 61. The operator then sets the value of horizontal difference 59 on horizontal scale 35, using edge 23 as an index. The operator then places device 11 at the upper lefthand corner of base 55 as shown in FIG. 3, with edge 23 along the lefthand edge of base 55 and edge 63 of slide 15 along the top edge of base 55. The lefthand edge of print 57 is then placed flush with edge 41 of slide 15, as shown in FIG. 3. Then, print 57 is centered horizontally on base 55 with lefthand margin 65 equal to righthand margin 67. Setting horizontal difference value 59 on horizontal scale 35 automatically results in edge 41 of slides 15 being displaced from index edge 23 a distance equal to one-half the horizontal difference value 59. Thus, the calculation and measurement of horizontal margins 65 and 67 is accomplished in one step by means of horizontal scale 35.

The operator then sets the vertical scale index 49 on the desired vertical scale 39. Because it is frequently desirable for aesthetic reasons to have a larger margin width 53 below the mounted print 57 than above it at 51, three vertical scales 39 are provided. If an equal margin width for both upper margin 51 and lower margin 53 is desired, than the 50/50 vertical scale 39A is used. If a 40/60 ratio is desired, scale 39B is utilized, while if a 30/70 ratio is wanted, then scale 39C is used. The operator takes the vertical difference measurement 61 and sets vertical scale index 49 to that value on the desired vertical scale 39. The operator then makes sure that upper edge 63 of slide 15 is flush with the upper edge of base 55, as shown in FIG. 3. Print 57 is then adjusted in position until the upper edge of print 57 is in line with index edge 49 of scale locator 45, as shown in FIG. 3. Thus, print 57 is vertically located on base 55 with the desired margins above and below the print.

It is apparent that once indicies 23 and 49 are properly set and device 11 is in alignment on mounting base 55, the two steps of aligning print 57 with edges 41 and 49 may be accomplished in one step. The operator can place print 57 on base 55, aligning the upper lefthand corner of print 57 with edges 41 and 49 on device 11 in one quick step.

When not in use, slide 15 may be entirely slid into cavity 31 of envelope 13, such that device 11 then presents a compact and easy to carry shape.

The result is a mounting device which greatly simplifies and shortens the task of properly mounting a print on a base.

Although the foregoing invention has been described in some detail, by way of illustration and example for purposes of clarity of understanding, it is understood that certain changes and modifications may be practiced within the spirit of the invention and scope of the appended claims.

What is claimed is:
1. A print mounting device comprising,
an envelope, said envelope marked along one edge with indicia calibrated in full size units to measure the dimensional difference between a mounting base and a print to be mounted on said base,
a card slidable longitudinally in said envelope, said card marked with indicia providing a horizontal scale on said card, said horizontal scale calibrated in half-size units along one longitudinal edge of said card one transverse edge of said envelope acting as an index for said horizontal scale, said horizontal scale indicating the horizontal width of a margin on said base when said index scale is set to a number on said horizontal scale equal to the horizontal dimentional difference between said base and said print, and said card transversely marked with indicia providing a vertical scale on said card, said vertical scale calibrated in less than full size units to indicate the vertical width of a margin on said base when said vertical scale is set to a number equal to the vertical dimensional difference between said base and said print, said horizontal scale and said vertical scale relatively positioned to permit the simultaneous horizontal and vertical placement of a print on a mounting base.

2. A print mounting device according to claim 1 which further comprises a plurality of vertical scales transversely marked on said card, each of said vertical scales calibrated to indicate different ratios between the vertical width of the top and bottom margins on said base.

3. A print mounting device according to claim 1 which further comprises,
a vertical scale index, said index slidably affixed to said card,
and in which said vertical scale on said card runs from top to bottom of said card, the zero point of said vertical scale being the upper horizontal edge of said card, such that when said zero point is positioned to coincide with the upper edge of said base, and said vertical scale index is set to a number on said vertical scale equal to the vertical dimensional difference between said base and said print, then said index indicates the proper position of the upper edge of said print on said base.

4. A print mounting device according to claim 1 in which said horizontal scale on said card runs from the edge of said card towards the center, the zero point of said horizontal scale being said vertical edge of said card, such that when said horizontal scale index is set to a number on said horizontal scale equal to the horizontal dimensional difference between said base and said print and said horizontal scale index is positioned to coincide with one vertical edge of said base, then said horizontal scale zero point indicates the proper position of the vertical edge of said print on said base.

References Cited

UNITED STATES PATENTS 1,465,106    8/1923    White _____ 33—173

SAMUEL S. MATTHEWS, *Primary Examiner.*